Figure 1:
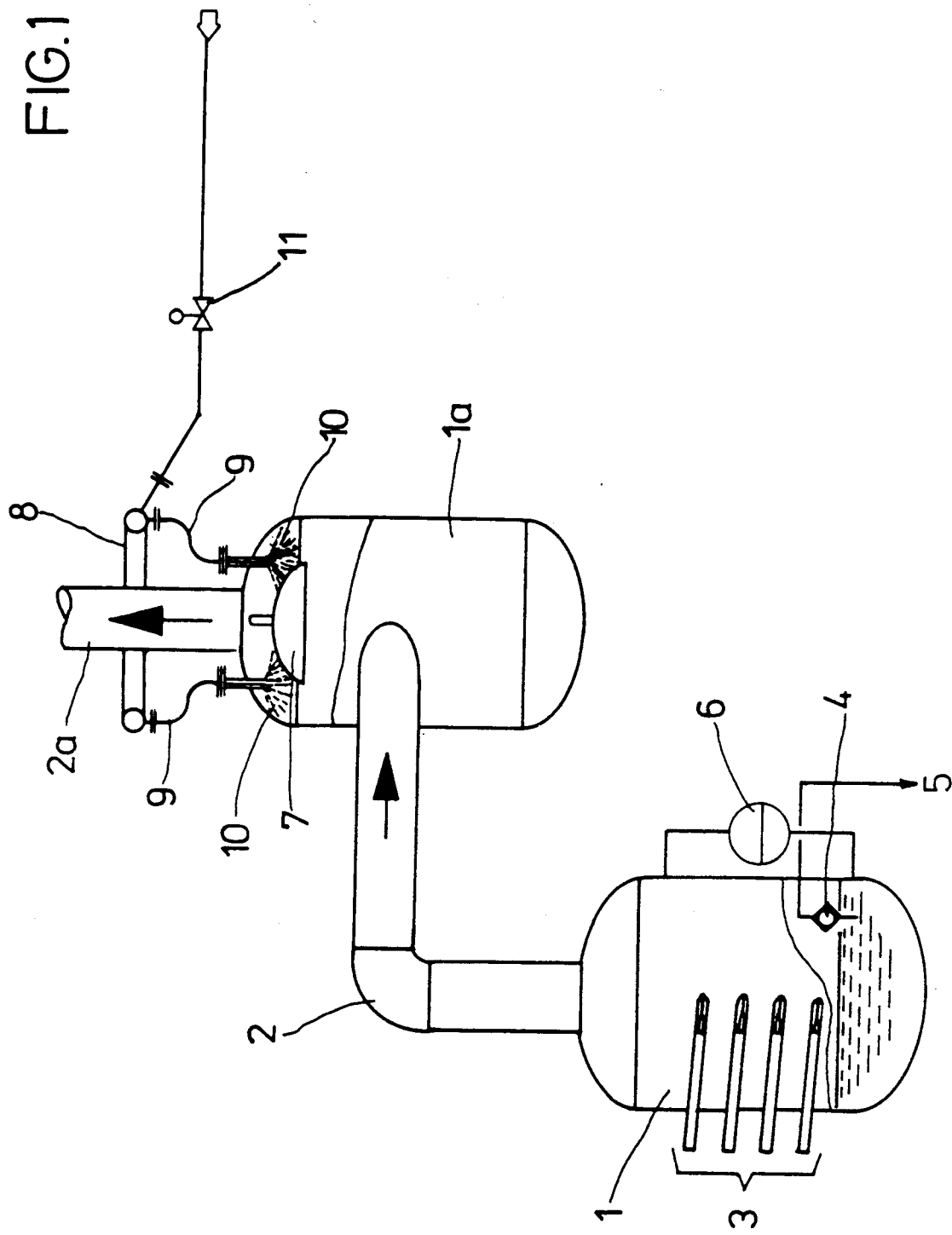

United States Patent [19]

Kanne et al.

[11] Patent Number: 4,996,026

[45] Date of Patent: Feb. 26, 1991

[54] SEPARATION SYSTEM AND REDUCING THE EMISSION OF SOLIDS IN PRESSURE RELIEF PROCESSES IN HIGH PRESSURE POLYMERIZATION REACTORS

[76] Inventors: Friedrich Kanne, 3 Antoniusstrasse, 5047 Wesseling; Klaus Pfleger, 6 Otto-Strasse, 5047 Wesseling; Hans Glomb, 22 Ulmenstrasse, 5047 Wesseling; Gerhard Arnold, 4 Weissdornweg, 5047 Wesseling; Klaus Boettcher, 5 Antoniusstrasse, 5047 Wesseling; Siegfried Kursawe, 4 Fasanenweg, 5047 Wesseling, all of Fed. Rep. of Germany

[21] Appl. No.: 328,791

[22] Filed: Mar. 24, 1989

Related U.S. Application Data

[63] Continuation of Ser. No. 104,228, Oct. 5, 1987, abandoned.

[51] Int. Cl.$^5$ .............................................. C08F 2/00
[52] U.S. Cl. ..................................... 422/106; 422/117; 422/131; 422/134; 422/189; 526/71
[58] Field of Search ............... 422/106, 110, 117, 131, 422/134, 189; 526/71; 431/202, 356; 60/687, 688, 689, 694

[56] References Cited

U.S. PATENT DOCUMENTS

| | | | |
|---|---|---|---|
| 544,119 | 8/1895 | Powers | 422/117 |
| 565,669 | 8/1896 | Clark | 422/117 |
| 3,127,377 | 3/1964 | Lindenauer | 526/71 |
| 3,427,138 | 2/1969 | Donnelly et al. | 422/131 |
| 3,579,307 | 5/1971 | Wakita et al. | 422/131 |
| 3,781,256 | 12/1973 | Sadee et al. | |
| 3,907,510 | 9/1975 | Collins | 422/117 |
| 4,339,412 | 7/1982 | Durand et al. | 526/71 |
| 4,534,942 | 8/1985 | Grasset et al. | 422/131 |
| 4,627,962 | 12/1986 | Grasset et al. | 422/131 |
| 4,690,800 | 9/1987 | Nardi et al. | 526/71 |

Primary Examiner—Robert J. Warden
Assistant Examiner—Timothy M. McMahon
Attorney, Agent, or Firm—Keil & Weinkauf

[57] ABSTRACT

In a separation system (1 to 11) for tube reactors or autoclaves, which are used for the polymerization of ethylene or copolymerization of ethylene with ethylenically unsaturated comonomers in the presence of an initiator under from 500 to 4,000 bar and at from 150° to 350° C., for reducing the emission of solids during pressure relief processes of the reaction mixture present in the reactor or autoclave, the reaction mixture let down is fed via two or more separating containers (1, 1a) installed in series before it reaches the atmosphere.

8 Claims, 2 Drawing Sheets

SEPARATION SYSTEM AND REDUCING THE EMISSION OF SOLIDS IN PRESSURE RELIEF PROCESSES IN HIGH PRESSURE POLYMERIZATION REACTORS

This application is a continuation of application Ser. No. 104,228, filed on Oct. 5, 1987 now abandoned.

The present invention relates to a separation system for tube reactors or autoclaves, which are used for the polymerization of ethylene or copolymerization of ethylene with ethylenically unsaturated comonomers in the presence of initiators under from 500 to 4000 bar and at from 150° to 350° C., for reducing the emission of solids during pressure relief processes of the reaction mixture present in the reactor or autoclave.

The polymerization of ethylene or the copolymerization of ethylene with other ethylenic, polymerizable monomers is carried out in tube reactors or autoclaves under up to 4000 bar and at from 150° to 350° C. in the presence of initiators (free radical formers) and, if necessary, moderators (regulators).

In the exothermic polymerization reaction, about 800 kcal is evolved as heat of reaction per kg of polymer formed, and this heat of reaction must be removed very rapidly. This is necessary in order to avoid overheating the reaction mixture, which leads to decomposition of the ethylene and possibly the polyethylene into carbon, hydrogen and methane. The decomposition reactions are likewise highly exothermic and take place in accordance with the following equations:

$$C_2H_4 \rightarrow C + CH_4 + 30 \text{ kcal/mol} \quad (1)$$

$$C_2H_4 \rightarrow 2C + 2H_2 + 11 \text{ kcal/mol} \quad (2)$$

$$1/n\ (C_2H_4)_n \rightarrow C + CH_4 + 8 \text{ kcal/mol} \quad (3)$$

Decomposition of the ethylene preferably (85–95%) takes place according to equation 1) with formation of methane and carbon, temperatures up to 1550° C. being reached; to a small extent (10–15%), the decomposition of ethylene gives hydrogen and carbon. In this case, the temperature may increase to 680° C.

It is therefore very important during operation of a tube reactor or autoclave to carry out the polymerization in a controlled manner, i.e. with measures for the adequate removal of the heat of reaction. However, this is not always achieved in practice. As a result of technical defects and failure of control and measuring apparatuses, situations arise in which the necessary heat removal is no longer ensured, and decomposition of the reaction mixture present in the reactor occurs. In such a case, a conventional automatic system is used to initiate an emergency program.

Charging of the reactor with ethylene, where relevant comonomers, initiators and moderators is stopped, and valves on the reactor are opened, via which the reaction mixture present in the reactor is let down into the atmosphere. It is known that, when the reaction mixture in autoclaves or tube reactors is let down into the atmosphere, the hot gas/product mixture ignites.

In the literature, the resulting explosions are referred to as aerials. U.S. Pat. No. 3,781,256 describes a method for preventing aerials. The hot reaction mixture subjected to decomposition leaves the reactor and is then conveyed in a pipeline which contains water-filled plastic sacks. Because of the temperature and the pressure which builds up when the reaction mixture flows into the roof pipe, the plastic sacks are destroyed; the water which flows out is supposed to cool the reaction mixture to such an extent that no ignition occurs when the gas emerges into the atmosphere.

Although this known procedure reduces the danger of explosions when the reaction mixtures are let down into the atmosphere, the emission of hydrocarbons and solid particles, such as soot and fine and coarse polyethylene powder is not avoided. Depending on the size of the reactor used, up to 200 kg of solid are emitted during a pressure relief process; this leads to very severe environmental pollution.

It is an object of the present invention to provide a separation system which makes it possible to reduce or effectively eliminate the emission of solids which occurs during pressure relief processes in tube reactors or autoclaves which are used for the polymerization of ethylene.

We have found that this object is achieved, according to the invention, by means of a separation system through which the reaction mixtures present in a tube reactor or autoclave pass during pressure relief processes prior to emerging into the atmosphere.

The reaction mixture is let down, or has to be let down, from the reaction apparatuses (autoclaves or tube reactors) for several reasons; an emergency program is initiated either by pressing a button (manually) or, as in most cases, by an automatic circuit. The latter is a conventional measuring and regulating system (e.g. AEG Logistat). If one of the above limiting values for the pressure and temperature monitoring of the reactor is reached, the reaction mixture is automatically let down by opening several valves on the reactor. This occurs, for example, on decomposition of the reaction mixture but also in the event of a faulty measurement or another technical defect. The two last-mentioned cases are referred to as spurious trippings. The reaction mixture which is present in the reactor but has not undergone decomposition is likewise let down from the reactor into the atmosphere. In this case, instead of soot, polyethylene particles together with the ethylene and any other hydrocarbons are released into the atmosphere.

According to the invention, the procedure now adopted is such that the reaction mixture arriving from the reactor must pass through a separation system during the pressure relief procedure before it reaches the atmosphere.

The drawings schematically illustrate an embodiment of the invention, which is described in detail below.

Figure 2:
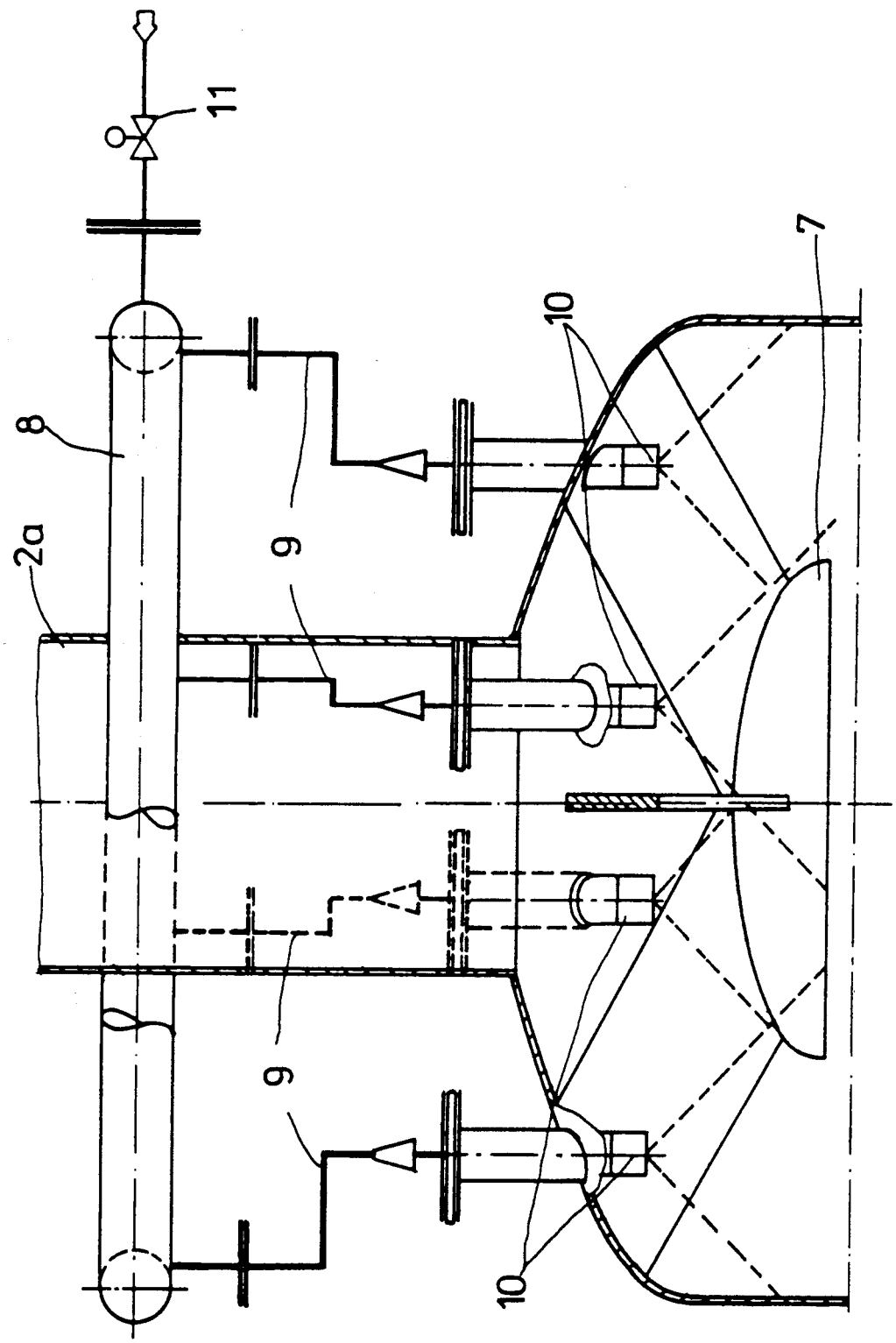

FIG. 1 shows a side view of the separation system with two separating containers, and FIG. 2 shows the baffles installed upstream of the outlet pipe of the second separating container.

The separation system 1 to 11 consists of a separating container 1, the lower fourth of which is filled with water and downstream of which further separating containers are connected via relatively wide pipelines. The separation system is preferably equipped with two or three separating containers. The separating containers 1a downstream of the separating container 1 are provided with installations which prevent solid particles from emerging directly into the atmosphere.

The blow-out lines 3 of the pressure relief valves of the reactor not shown in the drawings are connected individually to the separating container 1. Depending on the size of the reactor, two or more pressure relief valves and/or bursting disks are used. If the reactor is equipped with bursting disks, their blow-out lines are also connected to the separating container 1. The blowout lines enter the separating container 1 by tangential pressure pipes in such a way that the latter are directed downward toward the surface of the water present in the container and terminate above the water level. The container is filled so that it is about one fourth full. To permit the water level in the separating container 1 to remain constant, the container is provided with a water overflow (4 to 5). The overflow pipe contains a valve 4 which closes when the container is under superatmospheric pressure and prevents gas from flowing out via the water overflow.

A radioactive level indicator 6 is installed as a safety device above the water level, on the outer wall of the container, the said level indicator indicating any accumulation of product in the container or blockages of the water overflow; the level indicator 6 is advisable for operation of the separating system but is not essential for effective removal of solids.

In the separating container 1, the hot reaction mixture comes into contact with the water present in the lower fourth of the container. The hot gas/product mixture is cooled, a major part of the water being vaporized. The major part of the solids arriving from the reactor during the pressure relief process is thus retained in the separating container 1. However, about 20–40% of the solids are carried away with the material stream leaving the separating container 1. In addition to the solids, the said material stream contains the ethylene which has been let down, and may contain other hydrocarbons, steam and entrained water. This product mixture is passed from the top of the separating container 1, via a relatively wide pipeline 2, into a separating container 1a. The pipeline 2 between the two containers should have a diameter of from 200 to 1,000 mm, preferably from 40 to 500 mm, at the entrance to the separating container 1a.

The pipeline enters the separating container 1a laterally and likewise tangentially. The separating container 1a is not filled with water; a 200–400 mm wide outlet pipe 2a is installed in its lid.

A dished end 7 is installed underneath the lid, inside the separating container 1a, upstream of the outlet pipe 2a, at a relatively short distance from the lid and from the inner wall of the container.

The dished end 7 is preferably mounted at a distance of from 100 to 200 mm, i.e. its diameter is chosen 200–400 mm smaller than the diameter of the separating container 1a.

By installing the dished end 7, the reaction mixture which has been let down is prevented from flowing out of the container directly. Instead, the material stream is braked and diverted into the relatively narrow passage between the edge of the dished end 7 and the inner wall of the container or the lid wall. Four lines 9 arranged at equal intervals and coming from a ring line 8 mounted around the outside of the outlet pipe 2a are fed through the container lid.

A special nozzle 10 is installed at the end of each of these lines 9. It is quite possible for further nozzles to be installed, and this is advisable where separating containers having large diameters are used. The special nozzles 10 employed are commercially available; type SZ 5 to SZ 14 axial fully conical nozzles from Lechler, Gelsenkirchen, having a spray angle of from 60° to 90° have proven useful. The nozzles 10 are charged with water under pressure or condensate, and the initial pressure in the ring line 8 must be not less than 3 bar higher than the maximum pressure generated when the reactor is let down in the separating container 1. Charging of the nozzles 10 with water under pressure or condensate is effected with the aid of a control valve 11. The control valve 11 is opened at the same time as the emergency program is initiated in the reactor, i.e. directly at the beginning of the pressure relief process. The amount of water under pressure or condensate flowing out of the nozzles is adjusted so that a thick water film is formed over the entire cross-section of the space between the container lid and the upper surface of the dished end 7, the said water film counteracting the material flow toward the outlet pipe 2a.

The novel procedure makes it possible for the solids present in the let-down reaction mixture to be virtually completely retained in the separation system 1 to 11. The material which emerges from the outlet pipe 2a into the atmosphere does not contain any soot or polyethylene particles but only the ethylene arriving from the reactor during the pressure relief process and any other gaseous hydrocarbons.

The water under pressure or condensate is sprayed until the pressure in the separating container 1a falls below 1 bar in the course of the pressure relief process. 10 to 300, preferably from 15 to 90, seconds are generally employed; the amounts of water required for forming the water film are from 3 to 20, preferably from 5 to 10, liters per second per nozzle. The amount of water required for an optimum separation effect and the time during which this amount of water is sprayed must be adapted to the particular separator volume. The latter must in turn be matched with the amount of reaction mixture arriving from the reactor. In practice, separators having a volume of from 2 to 25 m³ have proven useful; however, the use of containers having an even larger volume is not disadvantageous for achieving a good separation effect.

For effective separation of the solids, the ratio of the volumes of the separating containers to the volume of the reactor should be chosen greater than 2:1, preferably from 4:1 to 10:1.

EXAMPLE 1

The two containers of the separation system 1 to 11 each have a volume of 4.3 m³ and a diameter of 1200 mm. The separating container 1 is filled with 950 L of water. The connecting line 2 between the containers has a diameter of 400 mm. In the separating container 1a, the dished end 7, which has a diameter of 1,000 mm, is mounted up-stream of the outlet pipe 2a, which has a diameter of 400 mm, at a distance of 100 mm from the underneath of the container lid. Four special nozzles 10 (type SZ 6/ 461.286 from Lechler) are installed in the space between the lower surface of the lid and the upper surface of the dished end 7, the said nozzles being supplied with condensate via the ring line 8. The initial pressure in the ring line 8 is 30 bar; the condensate is fed in with the aid of the control valve 11, at the same time as the pressure relief valves in the reactor are opened. 0.6 tonne of reaction mixture is let down from the reactor.

The maximum pressures occurring during the pressure relief process are 6.9 bar in the separating container 1 and 6.4 bar in the separating container 1a, and are reached after about 1.5 seconds. The condensate is fed in for 20 seconds, 5.8 L of condensate per nozzle helping to form the water film within one second. After spraying of the condensate is ended, the pressure in the separating container 1a has fallen to less than 0.3 bar.

95 kg of solids are separated off in the separating container 1 and 35 kg in the separating container 1a.

No solids are emitted into the atmosphere.

EXAMPLE 2 (COMPARISON)

When the same reactor is let down into the atmosphere as in Example 1, using 0.6 tonne of reaction mixture, but without the separation system, about 130 kg of solids are emitted.

If the abovementioned reactor is let down into a container which has a volume of 4.3 m³ but does not possess any baffles or nozzles for forming a water film, the separation effect is likewise unsatisfactory.

95 kg of solids are found in the container; it may therefore be assumed that in this case 35 kg of fine and coarse polyethylene particles are emitted into the atmosphere during the pressure relief process.

We claim:

1. An apparatus for reducing the emission of solids during pressure relief processes of reaction mixtures present in tube reactors or autoclaves used for the polymerization of ethylene or copolymerization of ethylene with ethylenically unsaturated comonomers in the presence of an initiator under 500 to 4,000 bar and from 150° to 350° C. comprising:
   - a first separating container and at least one additional downstream separating container arranged in series,
   - inlet means through which the reaction mixture let down is fed into the first separating container, said inlet means tangentially entering the side of said first separating container and directed downward,
   - valve means for maintaining a constant water level in said first separating container,
   - connection pipe means located at the top of said first separating container and passing to said additional downstream separating container, said connecting means entering the side of said downstream separating container laterally and tangentially,
   - outlet means located at the top of said additional separating container,
   - dish shaped baffle means located at the top of said additional separating container and upstream of said outlet means, the diameter of said baffle means being smaller than the diameter of said additional separating container, and
   - at least four nozzle means for producing a water film, said nozzle means entering the top of said additional separating container and located between the edge of said baffle means and the inner walls of said additional separating container.

2. The apparatus of claim 1, wherein said valve means maintains the water level in such a way that said first separating container is filled to one fourth of its volume with water.

3. The apparatus of claim 1, wherein said connection means has a diameter of from 200 to 1,000 mm.

4. The apparatus of claim 3, wherein said diameter is from 500 to 500 mm.

5. The apparatus of claim 1, wherein said outlet means is 200 to 400 mm wide.

6. The apparatus of claim 1, wherein the diameter of said first separating container and said additional separating container is 1,200 mm the diameter of said baffle means is 200 to 400 mm smaller than the diameter of said additional separating container.

7. The apparatus of claim 1, wherein said at least four nozzle means are connected to a ring line mounted outside of and around said outlet means.

8. The apparatus of claim 1, wherein said first separating container and said additional separating container each have a volume of 4.3 m³.

* * * * *

UNITED STATES PATENT AND TRADEMARK OFFICE
CERTIFICATE OF CORRECTION

PATENT NO. : 4,996,026
DATED : Feb. 26, 1991
INVENTOR(S) : Kanne et al

It is certified that error appears in the above-identified patent and that said Letters Patent is hereby corrected as shown below:

On the title page, item [54] and col. 1, line 1, delete "AND" and insert --FOR--;

after item [22] please insert the following:
--[30] Foreign Application Priority Data
  Oct. 4, 1986 .....Fed. Rep. of Germany ....3633819.2--;

after item [76] insert the following:

--[73] Assignee:   BASF Aktiengesellschaft
                   Ludwigshafen, Fed. Rep. of Germany--.

Signed and Sealed this

Eighteenth Day of August, 1992

Attest:

DOUGLAS B. COMER

*Attesting Officer*         *Acting Commissioner of Patents and Trademarks*